United States Patent

Kraus, Jr. et al.

[11] Patent Number: 6,112,572
[45] Date of Patent: Sep. 5, 2000

[54] METHOD FOR TESTING TRANSDUCER HORN ASSEMBLY USED IN DEBUBBLING BY MONITORING OPERATING FREQUENCY VIA IMPEDANCE TRACE

[75] Inventors: Robert Peter Kraus, Jr., Rochester; Fugui He, Penfield; Roland J. Koestner, Penfield; Steven D. Possanza, Penfield; Paul P. Zontek, Spenceport, all of N.Y.

[73] Assignee: Eastman Kodak Company, Rochester, N.Y.

[21] Appl. No.: 09/477,862

[22] Filed: Jan. 5, 2000

Related U.S. Application Data

[62] Division of application No. 09/239,184, Jan. 28, 1999, which is a continuation of application No. 08/740,585, Oct. 31, 1996, abandoned.

[51] Int. Cl.[7] .................................................. G01M 19/00
[52] U.S. Cl. .............................................................. 73/1.82
[58] Field of Search ............................... 73/1.82; 367/13; 381/58, 59

[56] References Cited

U.S. PATENT DOCUMENTS 4,748,365  5/1988  Poupaer et al. ..................... 318/116 X
5,630,949  5/1997  Lekin ........................................ 216/61
5,637,947  6/1997  Kising et al. .
5,757,104  5/1998  Getmon et al. .......................... 310/317

Primary Examiner—Thomas P. Noland
Attorney, Agent, or Firm—Susan L. Parulski

[57] ABSTRACT

A method and apparatus for evaluating the end cap round transducer horn assemblies used in debubbling operations wherein the ECR THA can be evaluated off-line at both high and low power and on-line by making electrical measurements on the ECR THA. The electrical measurements are used to characterize the physical condition of the piezoelectric ceramics of the THA. A test box is employed to practice the method. The test box is connected between the THA and a signal analyzer. Power is supplied to the THA and the electrical signals across the THA are sampled. The sampled electrical signals are transmitted to the signal analyzer while maintaining the amplitude and phase relationship thereof. The sampled electrical signals are used to generate an impedance trace for the particular THA. That impedance trace is compared to a model impedance trace. In such manner, it can be determined whether the ECR THA is operational. Further, if the ECR THA is in working condition, the impedance trace can be used to determine how efficiently it is operating. This allows for an ultimate determination to be made of how well a particular ECR THA is functioning.

1 Claim, 9 Drawing Sheets

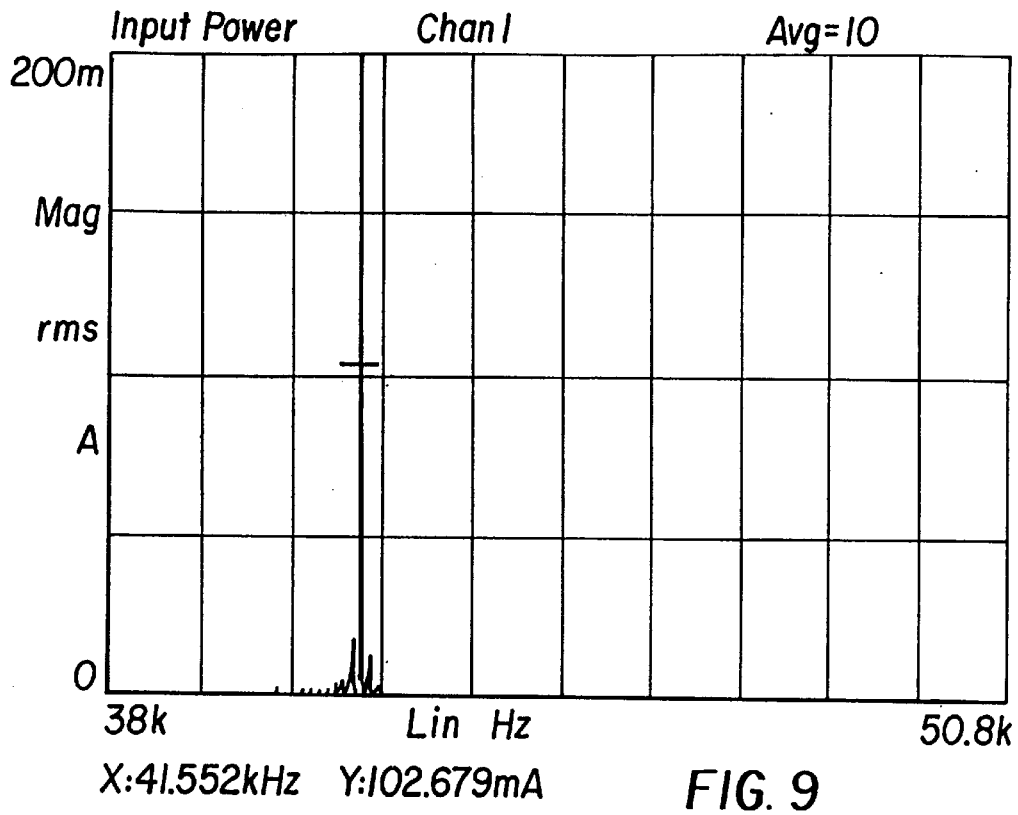
X:41.552kHz  Y:102.679mA   FIG. 9
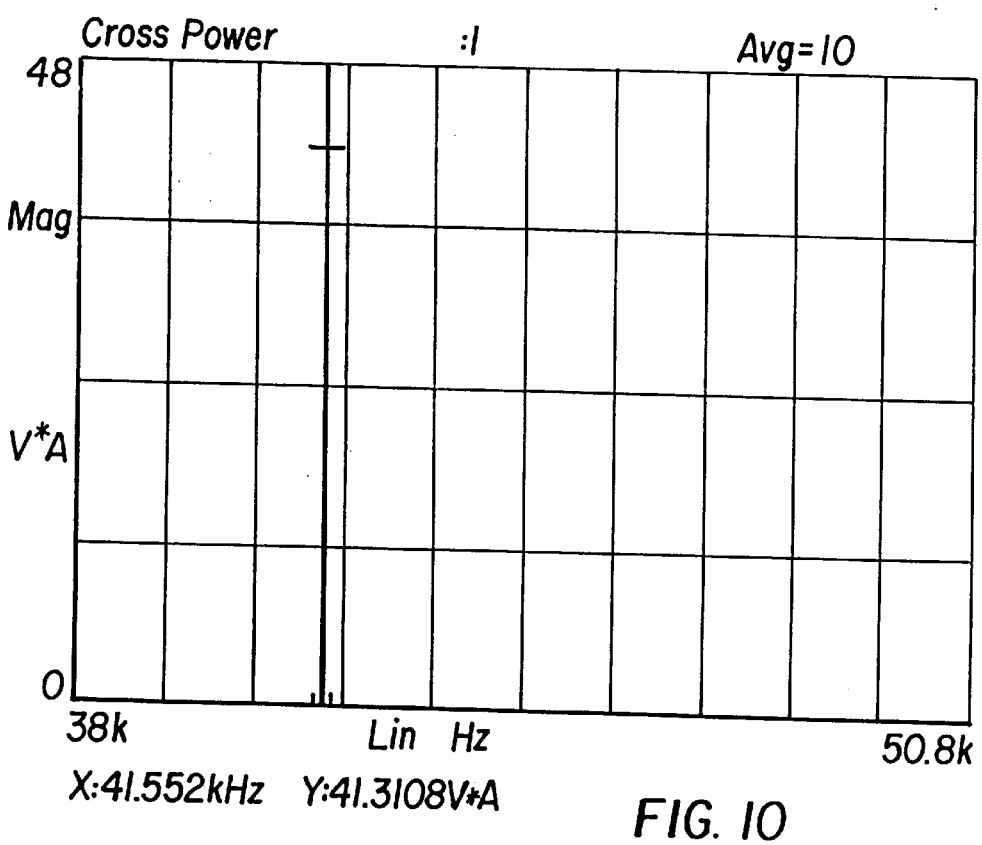
X:41.552kHz  Y:41.3108V*A   FIG. 10

X:41.552kHz  Y:201.165V

X:41.552kHz  Y:6.41619V*A (Ls=0.100 Cs=1.604*10^-10 Cp=2.5*10^-9 R=29)

(Ls=0.100 Cs=1.604*10^-10 Cp=2.5*10^-9 R=150)

METHOD FOR TESTING TRANSDUCER HORN ASSEMBLY USED IN DEBUBBLING BY MONITORING OPERATING FREQUENCY VIA IMPEDANCE TRACE

CROSS REFERENCE TO RELATED APPLICATION

This application is a division of U.S. application Ser. No. 09/239,184, filed Jan. 28, 1999 which is a continuation of U.S. application Ser. No. 08/740,585, filed Oct. 31, 1996 now abandoned.

FIELD OF THE INVENTION

The present invention relates generally to transducer horn assembly debubbling devices and, more particularly, to methods and apparatus for measuring the electrical and mechanical characteristics of a transducer horn assembly and for determining the effectiveness of the transducer horn assembly in debubbling operations.

BACKGROUND OF THE INVENTION

There are a variety of emulsions, suspensions, pastes and high viscosity liquids used in the manufacture or which become part of the variety of products in the chemical, pharmaceutical, food products, and photographic industries. These emulsions, suspensions, pastes and high viscosity liquids often contain air or gases which are dissolved therein or are present in the form of small bubbles. Often this air or gas, particularly in the case of entrained bubbles, is detrimental to the final product being produced. For example, in the case of photographic emulsions, the gas bubbles greatly impair the quality of the films or photographic papers produced with these emulsions because the bubbles disturb the evenness of volumetric flow of the emulsion as it is applied by the coating devices. This gives rise to the formation of streaks and spots making the photographic materials unusable.

An apparatus which is typically used in the photographic industry for debubbling photographic emulsions is an end cap round ultrasonic bubble eliminator, typically referred to as an ECR. The ECR includes a transducer horn assembly (hereinafter referred to as a "THA") which is an electromechanical device which converts electrical vibration to mechanical vibration. One particular ECR with its component THA is taught in U.S. Pat. No. 5,373,212 to Beau. In the operation of an ECR, an alternating voltage is applied to the ceramic disk of the THA which, as a result, generates mechanical vibration. This mechanical vibration results in the debubbling of the photographic emulsions flowing through the ECR.

The effectiveness and efficiency of an ECR THA in the performance of debubbling operations can be critical to whether or not an acceptable final product is produced. In the past there has been no practical method for testing the effectiveness and efficiency of an ECR THA and, therefore, an ECR THA which was no longer performing adequately was not replaced or repaired until it had resulted in the production of product which was out of specification or otherwise not useful. As a result, a means of testing the effectiveness and efficiency of the ECR THA was needed. Preferably, testing of the ECR THA could be performed on-line.

SUMMARY OF THE INVENTION

It is, therefore, an object of the present invention to provide a method and apparatus for testing ECR THA's to determine and to predict the debubbling efficiency of the ECR itself.

A further object of the present invention is to provide a method and apparatus for testing an ECR THA's which can be performed at either low or high power with the ECR off-line.

Still another object of the present invention is to provide a method and apparatus for testing ECR which can be performed with the ECR operating on-line.

Briefly stated, these and numerous other features, objects and advantages of the present invention will become readily apparent upon a reading of the detailed description, claims and drawings set forth herein. These features, objects and advantages are accomplished by making electrical measurements on the ECR THA and using those measurements to characterize the physical condition of the piezoelectric ceramics of the THA. In order to make electrical measurements on an ECR horn, it is necessary to measure the voltage and current drive signals. Since the ECR operates at high frequencies, nominally 40 kHz, an accurate alternating current measurement is required. The measurement must have a band width sufficient to maintain the fidelity of the signals and it must preserve the phase relationship between the voltage and current signals. A test box is connected between the ECR and a signal analyzer. The test box contains an electrical circuit which includes a current transformer in the supply leg of the drive signal being supplied to the horn, and a high impedance voltage divider between the supply and return legs. The current transformer provides an output voltage that is proportional to the current in the supply leg. The voltage divider provides a voltage signal that is $\frac{1}{100}$th of the drive voltage. Capacitors are added to the circuit to compensate for stray capacitance in the voltage divider that can lead to unwanted phase shifts between the output of the voltage divider and the signal supplied to the current transformer. By making these measurements, an impedance trace can be generated for the horn. This impedance trace is compared to a model impedance trace. The model impedance trace has been developed for the purpose of understanding and predicting the performance of ECR THAs. Impedance measurements made directly on the ECR THAs have been used to confirm the model. Through the comparison of the impedance trace made for a particular ECR with the model, it can be determined whether the ECR is operational, that is, whether it is in good condition or damaged. Further, if the ECR is in working condition, the impedance trace can be used to determine how efficiently the ECR is operating. In this manner, an ultimate determination of how well a particular ECR is functioning as a debubbler can be made.

BRIEF DESCRIPTION OF THE DRAWINGS

FIG. 9 shows an on-line measurement of current as a function of frequency of an ECR THA made with the test set-up depicted in FIG. 3.

FIG. 10 shows an on-line measurement of power as a function of frequency of an ECR THA made with the test set-up depicted in FIG. 3.

DETAILED DESCRIPTION OF THE INVENTION

Figure 1:
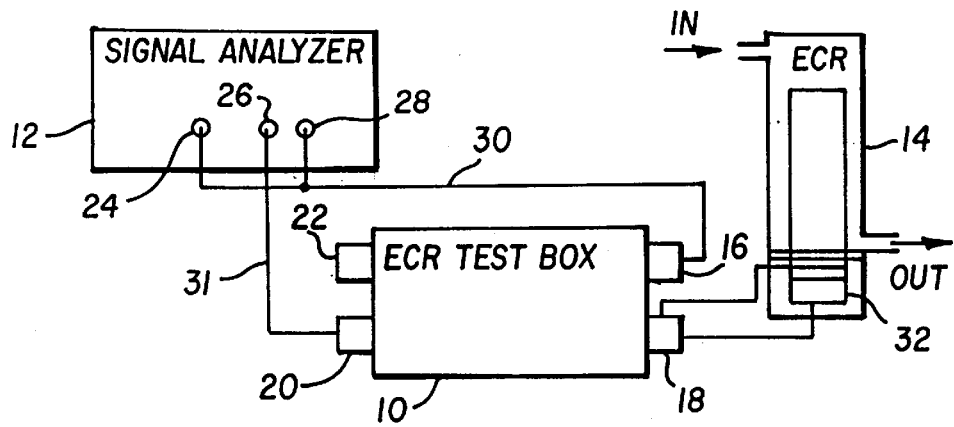
FIG. 1 is a schematic of the ECR test box of the present invention connected to a signal analyzer and to an ECR THA for testing the THA in an off-line, low power configuration.

Turning first to FIG. 1, there is shown a schematic for using the ECR test box 10 of the present invention in an off-line, low power configuration. The ECR test box 10 is connected both to a signal analyzer 12 and an ECR 14 and to the THA 32 which is part of the ECR 14. The ECR test box 10 includes a supply input terminal 16, an output terminal 18, a current output terminal 20, and a voltage divider output terminal 22.

The signal analyzer 12, which may be any suitable signal analyzer such as an HP3562A or HP 3567A as manufactured by Hewlett-Packard Corporation of Santa Clara, Calif., is configured to run a swept sine scan in a predetermined frequency range. As depicted in the drawings, the signal analyzer 12 includes a source connector terminal 24, a first channel connector 26, and a second channel connector 28. The source connector terminal 24 is connected by means of conductor 30 to the input supply terminal 16. The first channel connector 26 is connected to the current output terminal 20 by means of conductor 31. The second channel connector 28 also connects to input supply terminal 16 by means of conductor 30. The output terminal 18 is connected to the THA 32 of the ECR 14.

Figure 2:
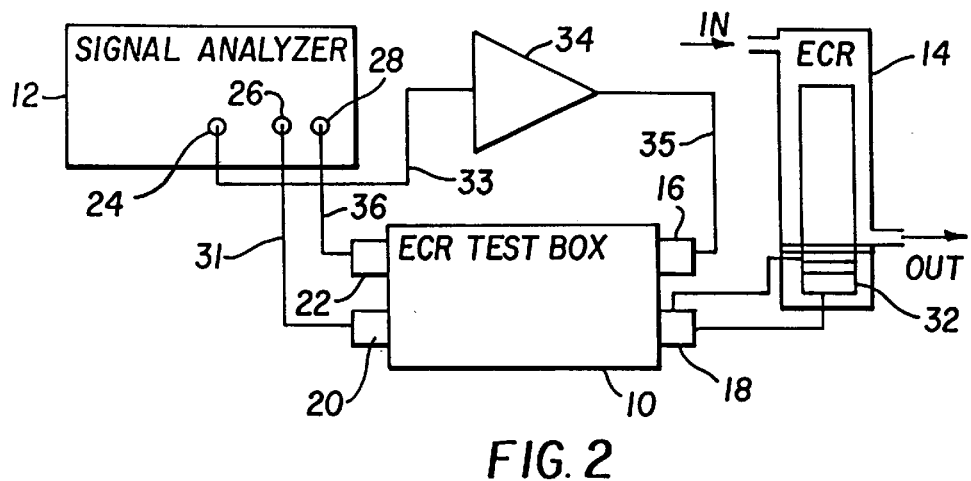
FIG. 2 is a schematic of the ECR test box of the present invention connected to a signal analyzer and to an ECR THA for testing the THA in an off-line, high power configuration.

Turning next to FIG. 2, there is shown the same ECR test box 10 of the present invention with appropriate connections for generating a high power impedance trace on a THA 32 with the THA 32 off-line. This high power configuration can be used for potentials up to 800 volts. In this high power, off-line configuration, a power amplifier 34 is necessary. The power amplifier is connected between the source connector terminal 24 and the input supply terminal 16 by conductors 33 and 35, respectively. A suitable power amplifier for use in this configuration is a Krohn-Hite 7500 as manufactured by Krohn-Hite Corp. of Avon, Mass. In this high power configuration, voltage divider output terminal 22 is connected to the second channel connector 28 by means of conductor 36. Those skilled in the art will recognize that operation of an ECR at high power without a liquid in the ECR can result in damage to the THA. Thus, when using the ECR test box 10 in accordance with FIG. 2, an appropriate liquid level should be maintained within the ECR.

Figure 3:
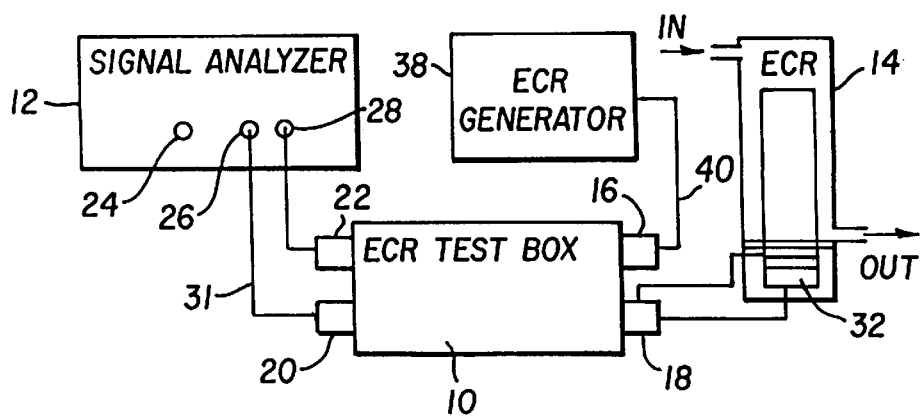
FIG. 3 is a schematic of the ECR test box of the present invention connected to a signal analyzer, an ECR generator and ECR THA for testing the ECR THA on-line.

Looking next at FIG. 3, there is shown a schematic of the ECR test box 10 of the present invention with the appropriate connections in order to generate frequency response curves for an ECR 14 on-line. In this instance, an ECR generator 38 is connected directly to the input supply terminal 16 of the test box 10 by means of a conductor 40. A suitable ECR generator for use in this configuration is a Wave Energy System 4002 as manufactured by Wave Energy Systems of Newtown, Pa. In this configuration, because the signal analyzer 12 is not being used to supply power to the THA 32, the source connector terminal 24 of the signal analyzer 12 is left unconnected.

Figure 4:
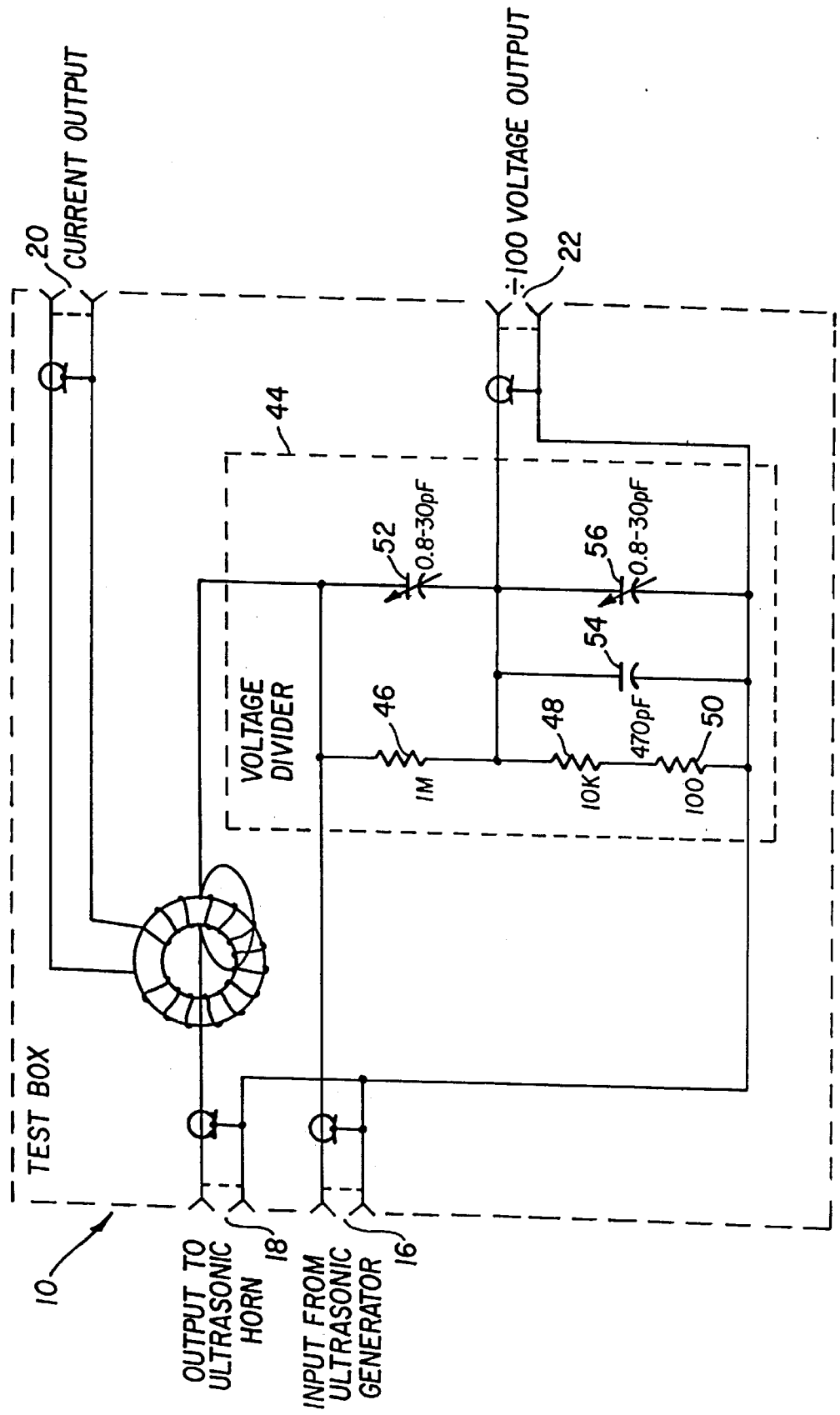
FIG. 4 is a circuit schematic for the electrical circuit within the ECR test box of the present invention.

Turning next to FIG. 4, there is shown a circuit schematic for the circuit within ECR test box 10. The circuit within ECR test box 10 includes a current transformer 42 in the supply leg of the drive signal being applied to the THA 32. The circuit also includes a high impedance voltage divider 44 (that portion of the circuit contained within the dotted line box) between the supply and return legs to and from the ultrasonic horn of the THA 32. The current transformer 42 provides an output voltage that is proportional to the current in the supply leg. For example, the output of the current transformer 42 is 10 volts/amp and the voltage divider provides a voltage signal that is 1/100th of the drive voltage or 0.01 volts/volt. The high impedance voltage divider 44 includes a first resistor 46, a second resistor 48 and a third resistor 50 which are in series. The high impedance voltage divider 44 also includes a first capacitor 52, a second capacitor 54 and the third capacitor 56. First capacitor 52 is in parallel with first resistor 46. Second and third capacitors 54, 56 are parallel to one another and parallel with second and third resistors 48, 50. First, second and third capacitors 52, 54, 56 are added to compensate for stray capacitance in the voltage divider 44 that can lead to unwanted phase shifts between the output of the voltage divider 44 and the signal supplied by the current transformer 42. The capacitors 52, 54, 56 allow a user to adjust the circuit to compensate for such stray capacitance. Under these conditions, the test box offers 10 pf to 20 pf of shunt capacitance that results from the internal wiring of the test box 10. There is no compensation for this capacitance. This test box capacitance is less than the capacitance of one foot of standard coaxial cable, which for RG58C/U is 30.8 pf/ft$^3$. Since the measured static capacitance of an ECR horn is approximately 4000 pf, the test box capacitance can be neglected.

When the ECR test box 10 of the present invention is used in high voltage applications (see FIGS. 2 and 3), both the voltage divider output 22 and the current output 20 are used. When the test box 10 is used in a low voltage application (see FIG. 1), only the current output 20 is used. In the low voltage application, the voltage signal comes directly from the source output 24 of the dynamic signal analyzer 12. The dynamic signal analyzer 12 must have a band width of at least 100 kHz and should be capable of swept sine output. Further, the dynamic signal analyzer 12 should have at least two input channels and the analysis capability to ratio the input channels and provide a frequency dependent impedance trace in the form of magnitude and phase.

The method and test box 10 of the present invention provide for the generation of an impedance trace and response curves for an ECR horn. As suggested above, impedance traces describe the electromechanical characteristics of ECR horns. These traces can be related to the electrical equivalent circuit model of the horn. The shape of the impedance trace can be related to the physical condition of the horn.

Figure 5:
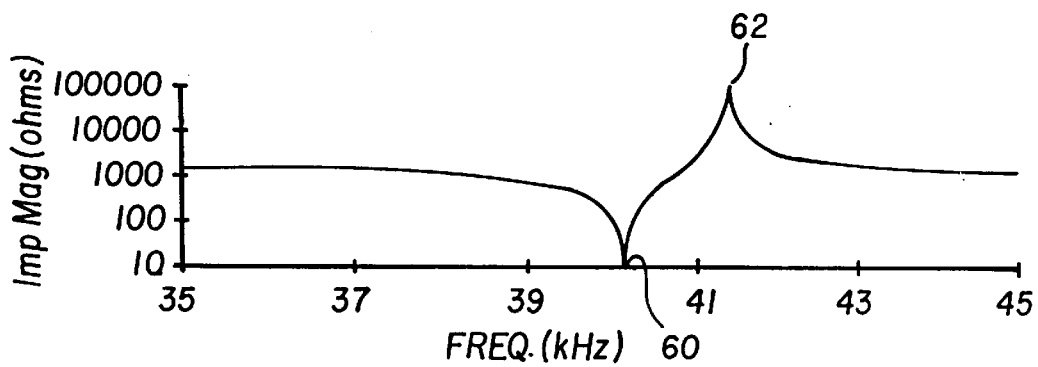
FIG. 5 depicts the magnitude of an impedance trace for a good THA tested under the set-up depicted in either FIG. 1 or FIG. 2.
Figure 6:
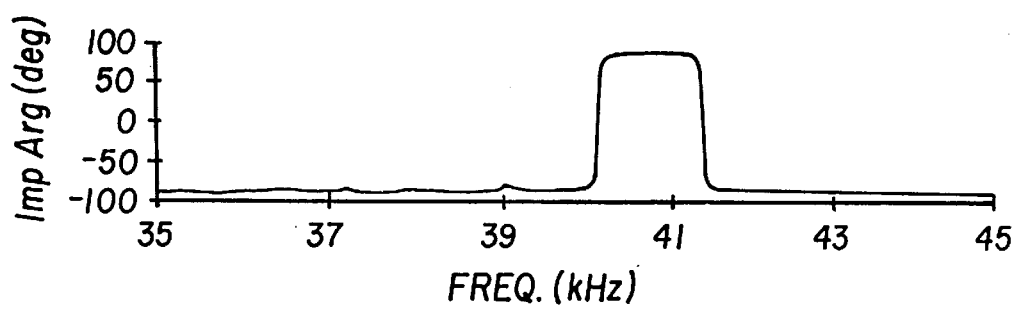
FIG. 6 depicts the phase of an impedance trace for a good THA tested under the set-up depicted in either FIG. 1 or FIG. 2.
Figure 7:
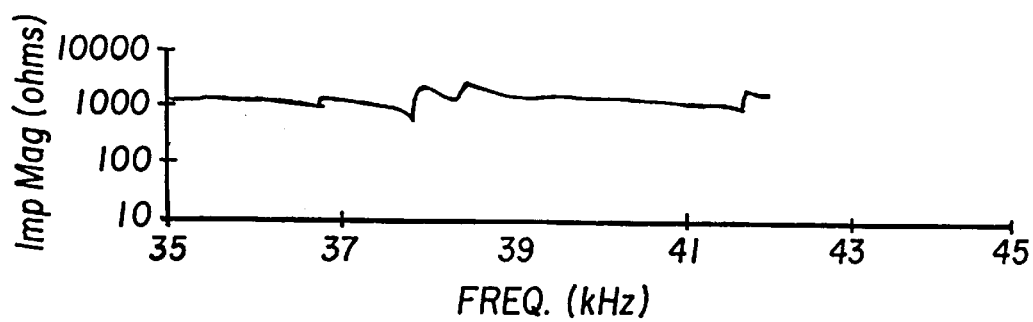
FIG. 7 depicts the magnitude of an impedance trace for a bad THA tested with the set-up depicted in either FIG. 1 or FIG. 2.
Figure 8:
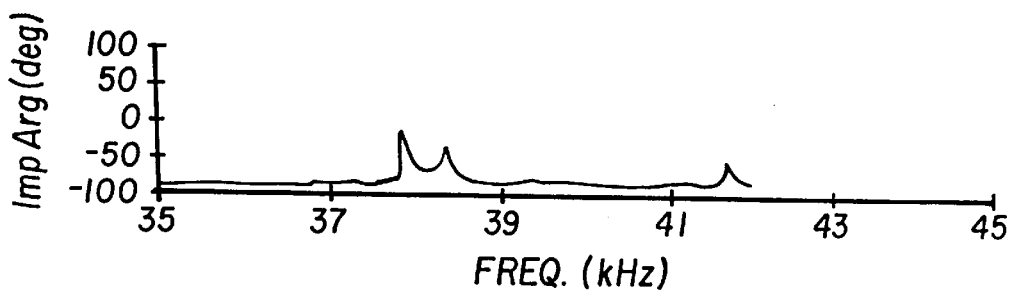
FIG. 8 depicts the phase of an impedance trace for a good THA tested under the set-up depicted in either FIG. 1 or FIG. 2.

Looking next at FIGS. 5 and 6, there is shown an impedance trace for a good horn tested under the set-up depicted in either FIG. 1 or FIG. 2. The low point 60 of the impedance trace in FIG. 5 is indicative of the series resonance point, that being at slightly more than 40 kHz. The high point 62 of the impedance trace set forth in FIG. 5 is indicative of the parallel resonance point. The impedance traces depicted in FIGS. 7 and 8 are indicative of a bad horn. Again, the impedance trace as set forth in FIGS. 7 and 8 were generated with a horn tested with either the set-up of FIG. 1 or FIG. 2.

Figure 11:
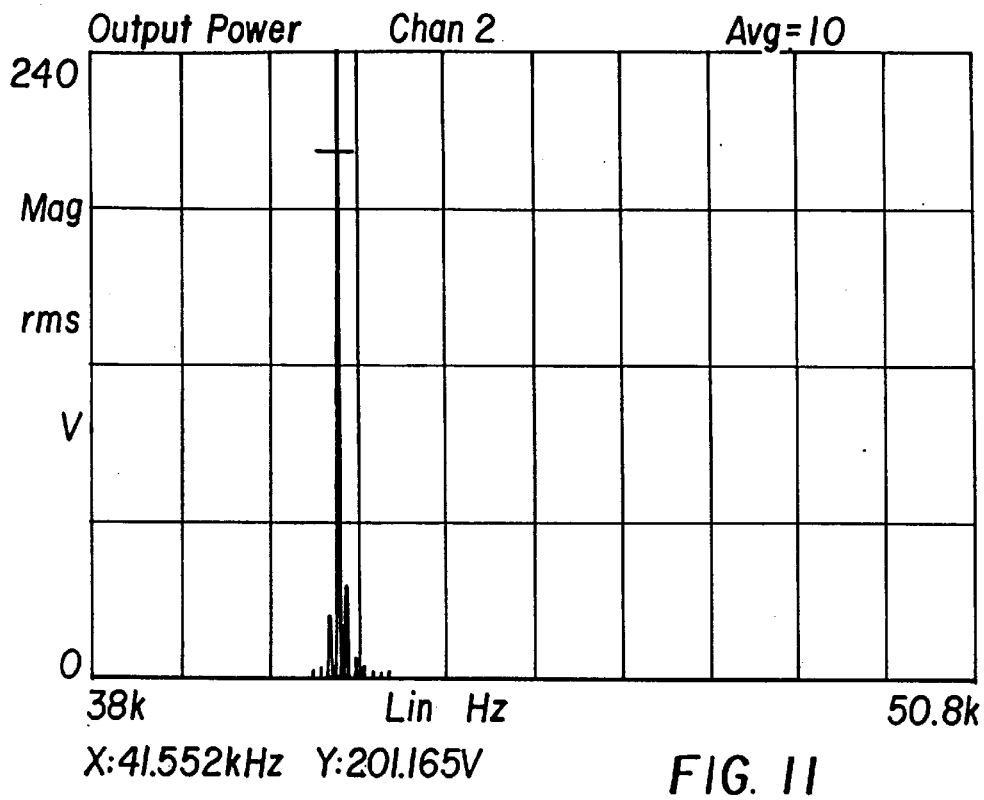
FIG. 11 shows an on-line measurement of voltage as a function of frequency of an ECR THA made with the test set-up depicted in FIG. 3.

FIGS. 9 through 14 show voltage, current, power (watts), complex power (volts-amps), and power factor as a function of frequency during an on-line measurement of an ECR horn made with the test set-up shown in FIG. 3. These figures are the measured frequency spectra of the primary electrical parameters, voltage and current collected simultaneously during on-line operation of the ECR, and additional electrical spectra calculated from the measured spectra. FIG. 9 shows that the ECR is drawing 102.679 mA at its present operating frequency of 41.522 kHz. FIG. 11 shows that its operating voltage is 201.165 Vrms (the frequency is the same as it should be). FIGS. 9 and 11 also show a series of sidebands around the main frequency peak. The sidebands are a result of the operating characteristics of the ECR generator and are always present in the various ECR generators we use.

Figure 12:
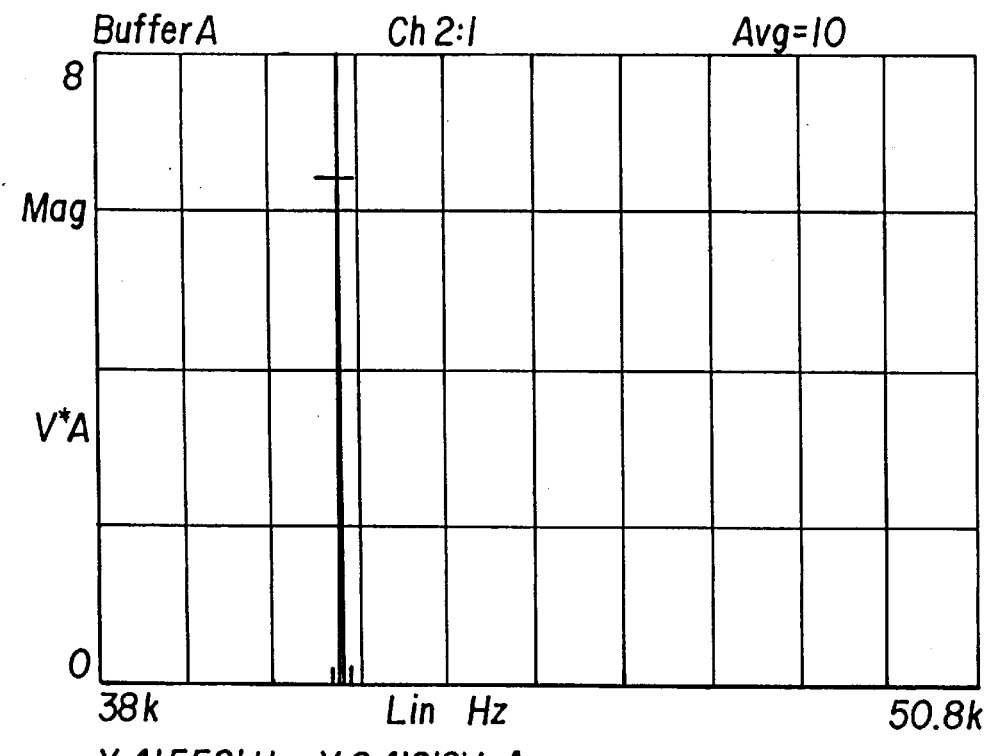
FIG. 12 shows an on-line measurement of real power as a function of frequency of an ECR THA made with the test set-up depicted in FIG. 3.
Figure 13:
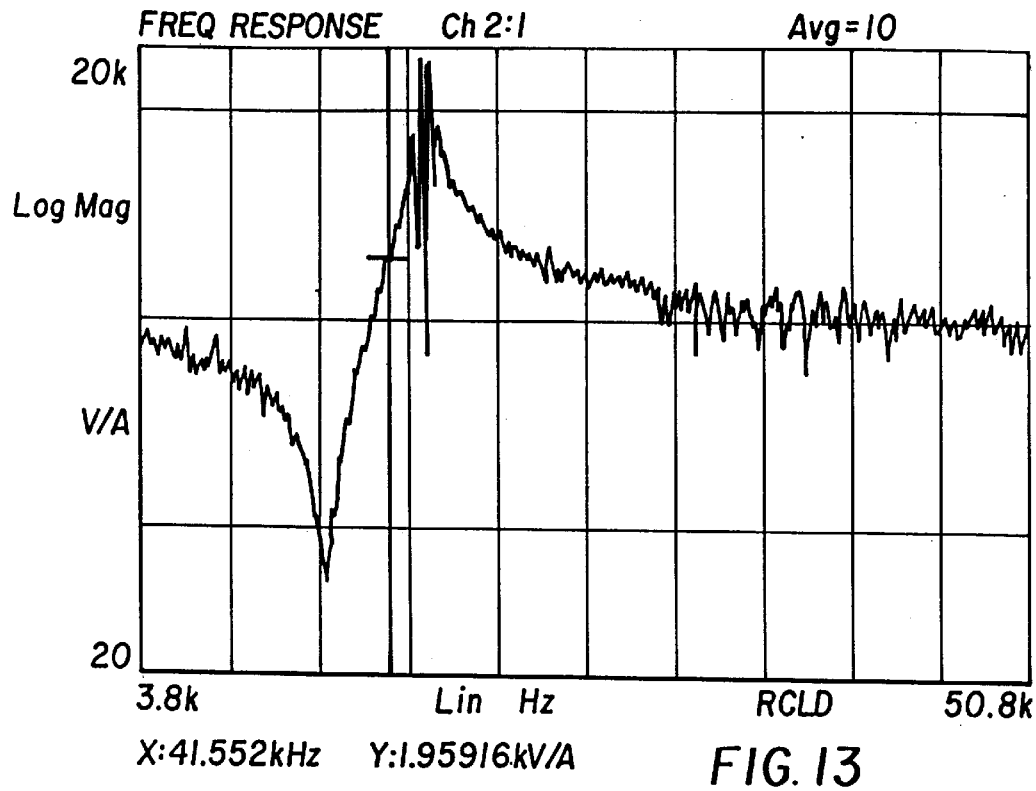
FIG. 13 shows an on-line measurement of volts per amp as a function of frequency of an ECR THA made with the test set-up depicted in FIG. 3.
Figure 14:
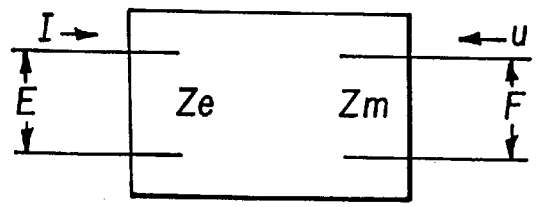
FIG. 14 is an equivalent circuit schematic for a piezo-electric transducer and its use as a source of ultrasonic energy where both the electrical and mechanical portions of the transducer are represented by electrical equivalents.

FIGS. 10, 12, and 13 are spectra calculated from the voltage and current spectra. Spectra in FIGS. 10 and 12 are power spectra resulting from the product of V and I (FIG. 11 times FIG. 9). FIG. 10 is the product of the magnitude of V*I. FIG. 12 is the real power which includes the contribution of the phase angle between V and I. $P = V*I*\cos(\Theta)$) where $\Theta$ is the phase angle. The analyzer makes this calculation by taking the real part of the V*I product shown in FIG. 10. Comparing the two power measurements indicates how well the ECR generator is tuned. FIG. 13 is the ratio of the volts and amps, V/I. You will note that this is the same definition as impedance and indeed FIG. 13 has the same shape as the previously described impedance traces, except more noisy. By comparing one of the primary spectra (i.e., voltage) with the V/I trace of FIG. 13, we can tell where on the impedance trace a particular ECR is operating during production. In the example given, the operating frequency of 41.552 kHz falls between the series resonance ($f_s$) and the parallel resonance ($f_p$) points. This is normal operation. If the operating frequency is outside of this range, the generator is mistuned and should be returned, or it is defective and should be replaced.

As mentioned above, with the test box 10 and method of the present invention, impedance traces may be generated for ECR transducer horn assemblies off-line under low and high power conditions. In addition, the test box 10 and method of the present invention allow for the generation of a variety of other electrical parameters on-line as depicted in FIGS. 9 through 13. Interpretation of these traces allows for making judgments as to the operating condition of the ECR transducer horn assemblies and as to the interaction of the THA with the other assembly components of the ECR as well as to the efficiency of the debubbling process. In particular, it is necessary to measure and set specifications on the values of $f_s$ (frequency at series resonance), $f_p$ (frequency at parallel resonance), $z_s$ (impedance at series resonance), and $C_o$ (electrical capacitance) as determined from the impedance traces. These specification values are based on efficiency requirements, the frequency operating range of the ECR generators being used, cabling requirements, and also on direct measurements made on a population of good transducer horn assemblies. The specification values for $C_o$, $f_s$, and $f_p$ are dependent upon the tuning range of the particular ECR generator being used. Any THA with a $z_s$ which is greater than 60 ohms should be removed from service. By comparing the impedance traces generated with the test box 10 and method of the present invention, transducer horn assemblies which fall outside the limits of the set specifications can be removed from service. It should be recognized that the values of these parameters can be tracked over time and through standard statistical techniques, trends in these parameters can be used to set retesting and preventative maintenance schedules for the transducer horn assemblies (THA).

The analysis of piezoelectric transducers and their use as sources of ultrasonic energy can be carried out by the application of the wave equation with appropriate boundary conditions and piezoelectric constants. However, it is convenient and appropriate to use the equivalent circuit approach where both the electrical and mechanical portions of the transducer are represented by electrical equivalents. If the acoustic radiation takes place from one side, the transducer can be represented by the electrical network shown in FIG. 14.

The electrical input to one side of the network, voltage (V) and current (I), result in the mechanical response, force (F) and particle motional velocity (u) at the output side. A mechanical system can be described by electrical equivalent components. Using the analog between force and voltage, and between velocity and current, the motional mass (M), motional stiffness (K), and radiation resistance (Zr), can be modeled by an inductance (Ls), a capacitance (Cs), and a resistance (R). With the use of a conversion factor, N, that depends on the dimensions of the transducer and the electromechanical coupling factor, the electrical circuit diagram shown in FIG. 15 can be developed.

This circuit includes an ideal electromechanical transformer with turns ratio N between the electrical and mechanical sides of the transducer. The modeled mechanical components represented in the circuit as lumped elements are actually continuously distributed throughout the THA. As a consequence, the mechanical system can resonate at a series of higher harmonics whereas the electrical model of FIG. 14 resonates at only a "single harmonic". Since the THA is operated only in a single frequency band, 38 kHz to 42 kHz, this model is used to represent the THA.

In general, it is a measure of how well a particular ECR can debubble that is of interest. In other words, is the ECR operational, is it in good condition or damaged, and if it is in working condition, how efficiently is it operating. With a measurement of the electrical impedance made at the input of the transducer, information can be derived on the mechanical performance of the ECR. The model further aids in understanding how well the TCAs work with different power supplies and the potential benefits of working at parallel resonance as opposed to series resonance.

Figure 15:
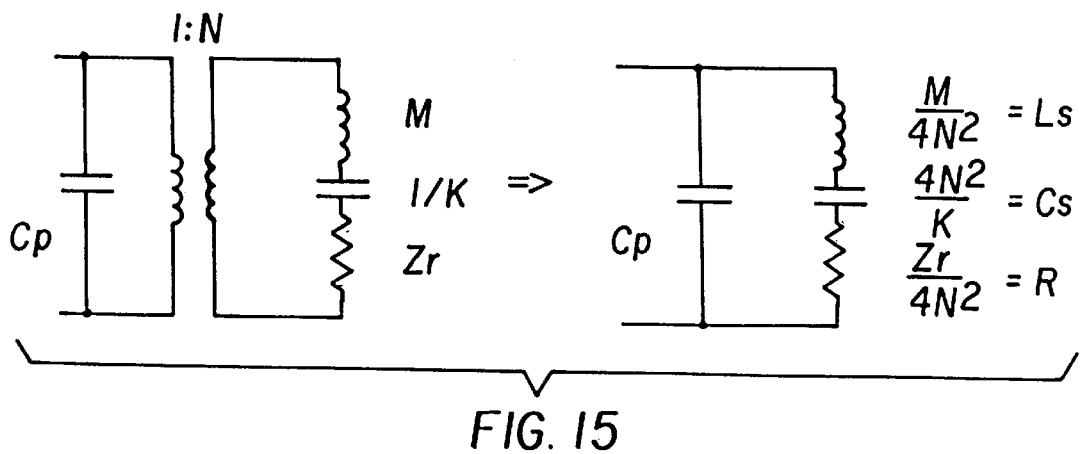
FIG. 15 is an electrical circuit diagram modeling the electrical and mechanical sides of a transducer.
Figure 16:
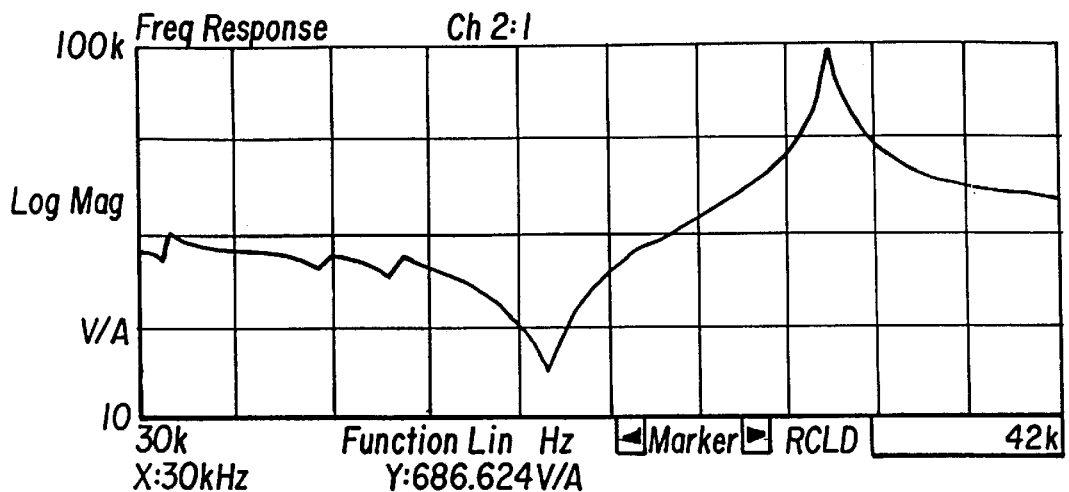
FIG. 16 is an impedance trace for a new ECR THA.

A procedure has been developed to measure the electrical impedance of the ECR horn. An impedance trace of a new ECR horn is shown in FIG. 16. The theoretical response curve for the equivalent circuit shown in FIG. 15 is shown in FIG. 17.

Figure 17:
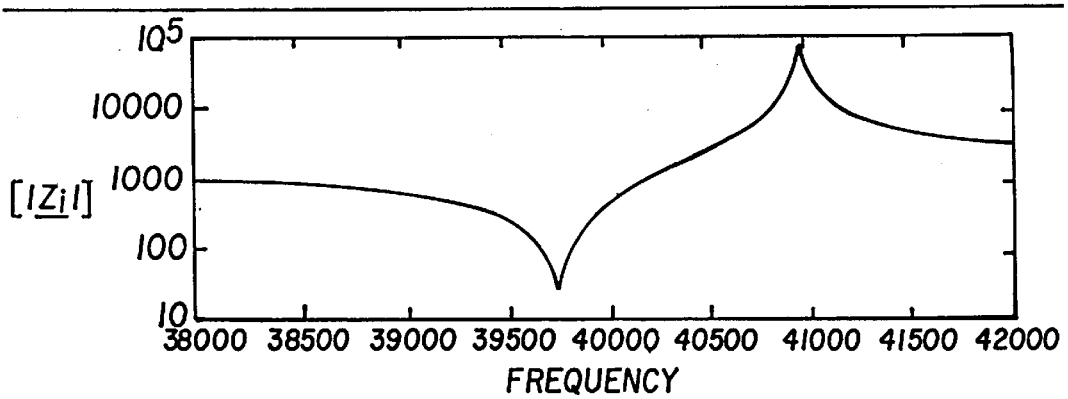
FIG. 17 is the theoretical response curve for the equivalent circuit depicted in FIG. 15.

By comparing FIGS. 16 and 17, values of the electrical circuit elements can be derived. The electrical circuit with elements derived from a good horn can now be used for comparing the state of a given ECR horn and predicting the operating efficiency.

From the equivalent circuit of FIG. 15 the equation for the input impedance can be derived as follows:

$$Z(j\omega) = \frac{\frac{1}{j\omega C_p}\left[R + j\omega L_s + \frac{1}{j\omega C_s}\right]}{\frac{1}{j\omega C_p} + R + j\omega L_s + \frac{1}{j\omega C_s}} \quad (1)$$

wherein $C_p$=static capacitance of the piezoelectric elements.

$\omega$=angular frequency($2\pi f$)

$j=\sqrt{-1}; j^2=-1$

Rearranging terms we get:

$$Z(j\omega) = \frac{\frac{1}{j\omega C_p}\left[R + j\left(\omega L_s - \frac{1}{j\omega C_s}\right)\right]}{R + j\left(\omega L_s - \frac{1}{\omega C_p} - \frac{1}{\omega C_s}\right)} \quad (2)$$

The series resonance is defined as the frequency at which the term in the numerator, $$\left(\omega L_s - \frac{1}{\omega C_s}\right)$$

is zero.

$$f_s = \frac{1}{2\pi}\sqrt{\frac{1}{L_s C_s}} \quad (3)$$

The impedance at $f_s$ is a minimum. Substituting into Equation 2;

$$Z_s(j\omega_s) = \frac{\frac{R}{j\omega_s C_p}}{R + j\left(-\frac{1}{\omega_s C_p}\right)} = \frac{R}{j\omega_s C_p R + 1} \quad (4)$$

For a good THA, the value of $j\omega_s C_p R$ is small compared to 1, and can be neglected.

$$Z_s \approx R \quad (5)$$

The parallel resonance is defined as the frequency at which the term $$\left(\omega L_s - \frac{1}{\omega C_s} - \frac{1}{\omega C_p}\right)$$

in the denominator of Equation 2 equals zero.

$$f_p = \frac{1}{2\pi}\sqrt{\frac{1}{L_s}\left(\frac{1}{C_s} + \frac{1}{C_p}\right)} \quad (6)$$

The impedance at $f_p$ is a maximum. Substituting into Equation 2;

$$Z_p(j\omega_p) = \frac{\frac{1}{j\omega_p C_p}\left[R + j\frac{1}{\omega_p C_p}\right]}{R} \quad (7)$$

For a good THA, $$R \ll \frac{1}{\omega_p C_p}$$

and, therefore, the impedance at parallel resonance becomes approximately, $$Z_p = \frac{1}{(\omega_p C_p)^2 R} \quad (8)$$

Note, that the impedances at both the series and parallel resonances for an unloaded THA are approximately real values. This can also be seen from the actual impedance trace of a horn in that the phase of the impedance at $f_s$ and $f_p$ is zero indicating a real value of impedance.

Figure 18:
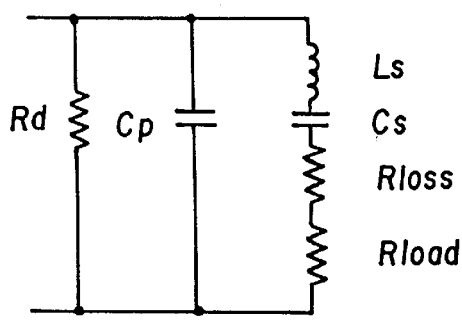
FIG. 18 is the equivalent circuit diagram for a transducer under liquid load modified to include losses within the horn ($R_{loss}$), mechanical radiation ($R_{load}$), and dielectric loss ($R_d$).
Figure 19:
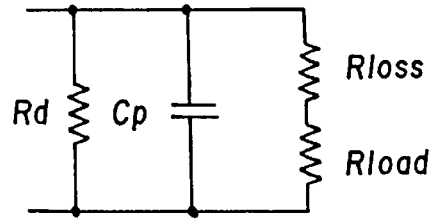
FIG. 19 is the equivalent circuit diagram for a transducer at series resonance under liquid load modified to include losses within the horn ($R_{loss}$) mechanical radiation ($R_{load}$) and dielectric loss ($R_d$).
Figure 20:
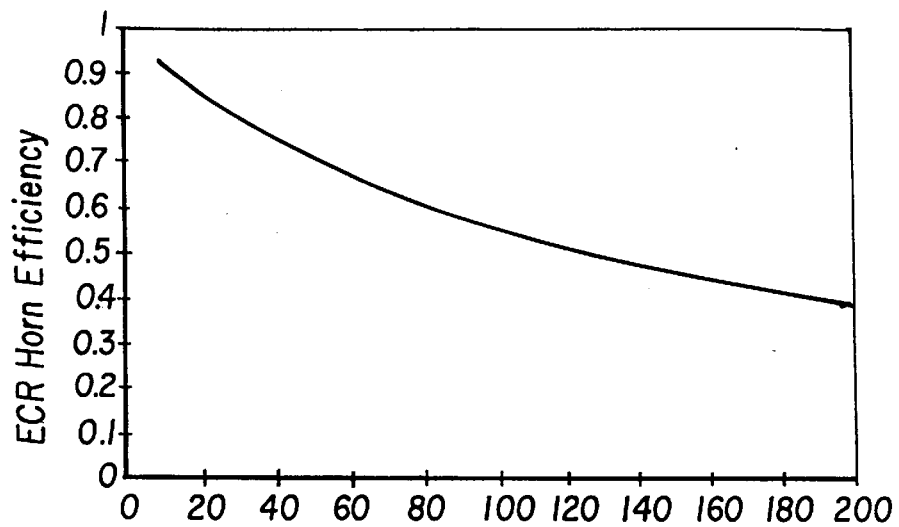
FIG. 20 is a graph plotting ECR THA efficiency versus impedance at series resonance with an air load.

For a transducer under liquid load, which is the normal operating condition of an ECR, the equivalent circuit can be modified to include $R_{loss}$ which represents losses within the horn and $R_{load}$ with represents mechanical radiation. For completeness, a resistor, Rd, representing dielectric loss can also be added. The resulting equivalent circuit is shown in FIG. 18, at series resonance, this reduces to the circuit shown in FIG. 19. If the dielectric loss is assumed to be negligible ($R_d \to \infty$), the efficiency of the ECR horn can be determined by;

$$\eta = \frac{\text{power radiated to liquid load}}{\text{total input power}} \quad (9)$$

$$= \frac{W_{load}}{W_{load} + W_{loss}}$$

$$= \frac{R_{load}}{R_{load} + R_{loss}}$$

where $\eta$ is the efficiency and $W_{load}$ and $W_{loss}$ are the power lost in the transducer and the radiated power respectively. The value $R_{loss}$ can be determined for any individual horn from the series resonance impedance, Equation 5. The determination is only valid for a good horn where the series resonant impedance occurs at approximately zero phase angle. The value of $R_{load}$ can also be determined from the impedance trace, in this case under loaded conditions. However, there is an interaction between the THA and the ECR housing under liquid load and, therefore, this measurement is not routinely made. A value of $R_{load}$ has been determined for a good horn under ideal conditions and this value is used in the efficiency calculation. Based on Equation 9 and an assumed value of R=125 ohms for distilled water, the calculated efficiency for an ECR THA can be determined using FIG. 20.

The overall power being delivered to the liquid for debubbling is then the product of the total input power, which is the wattmeter reading on the front panel, and the efficiency of the THA. This assumes no cavitation and no effects from the geometry of the housing.

The electromechanical coupling factor, $k_c$, is the ratio of the energy stored mechanically to the energy stored electrically. It is defined as, $$k_c = \frac{\pi}{2}\sqrt{\frac{1}{2}\frac{C_s}{C_p}} \quad (10)$$

This value can be obtained from the frequency separation between $f_s$ and $f_p$, which represents the extremes in impedance or total current. Combining Equations 3 and 6 results in, $$\frac{1}{f_s^2 C} = \frac{1}{f_p^2}\left(\frac{1}{C_s} + \frac{1}{C_p}\right) \quad (11)$$

$$\frac{C_s}{C_p} \cong \frac{1(f_p - f_s)}{f_s}; \quad k_c^2 \cong \frac{\pi^2}{4}\frac{(f_p - f_s)}{f_s} \quad (12)$$

The frequency separation, $\Delta f = (f_p - f_s)$, is large for materials with high electromechanical coupling. $C_p$ is the static capacitance of the crystals that make up the THA. In our applications, there is also a wiring capacitance that appears in parallel to $C_p$ and effectively causes the measured values of $C_p$ to be larger than the actual static capacitance. In general, the measurements of $k_c$ include the wiring capacitance which does not precisely fit the definition of $k_c$ applied to piezoelectric ceramics. However, it is useful for determining problems with wiring. The magnitude of this capacitance can effect the power that is being delivered to the THA, either because of the increased mismatch between the ECR and the generator which results in higher required voltages or currents, or because it could shift the resonant frequency outside the tuning range of an autotune generator. Also, a large $C_p$ means that $\Delta f$ is small. It has been found that a small $\Delta f$ makes tuning of the generator more critical and more difficult to achieve.

The magnitude impedance of a good THA looks like that depicted in FIG. 5. FIG. 7 shows the magnitude of the impedance of a badly damaged THA that was removed from an actual manufacturing machine. The crystals were cracked in many places and chunks of ceramic had fallen off the crystal. In this case, the crystals are so damaged that the impedance trace cannot be analyzed according to the model. The electrical values $f_s$, $f_p$, Zs, Zp cannot be properly determined even though you can find maximum and minimum values of impedance somewhere on the trace. For extreme cases like this, the THA must be replaced.

There are basically two main ways the impedance trace shifts from the ideal with changes in the electrical parameters of interest.

1) As R increases, Zs increases (by Equation 5) and Zp decreases (by Equation 8) but, $f_s$ and $f_p$ remain in about the same location within the assumptions of the approximations. This shift is shown in the modeled responses of FIGS. 21 and 22 where R is low in FIG. 21 and increases in FIG. 22. All other values remain the same.

2) As $C_p$ increases, $f_s$ remains the same, $f_p$ decreases (by Equation 6) and Zp decreases (by Equation 8). Zs remains approximately constant within the approximation of the assumption that $$R \ll \frac{1}{\omega_s C_p}.$$

Figure 21:
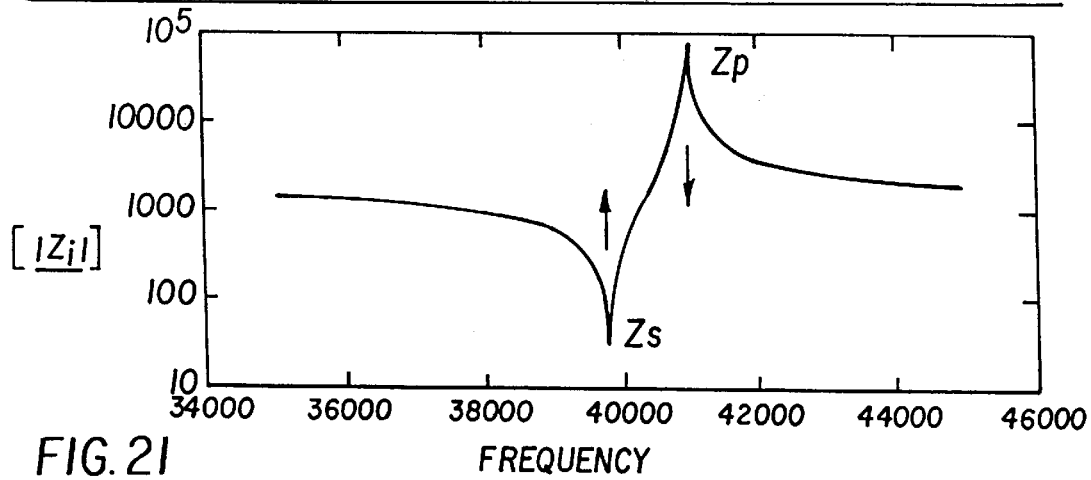
FIG. 21 is an impedance trace showing the model response for impedance at series resonance of 29 ohms and a static capacitance of 2.5 nF which are characteristic of an ECR THA under air load with six feet of coaxial cabling.
Figure 22:
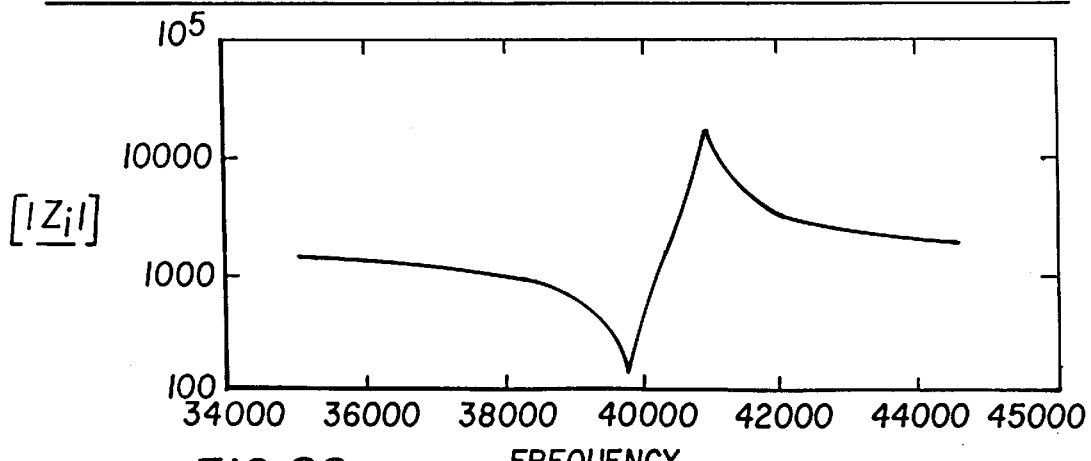
FIG. 22 is an impedance trace showing the model response for impedance at series resonance of 150 ohms and a static capacitance of 2.5 nF which are characteristic of an ECR THA under water load with six feet of coaxial cabling.
Figure 23:
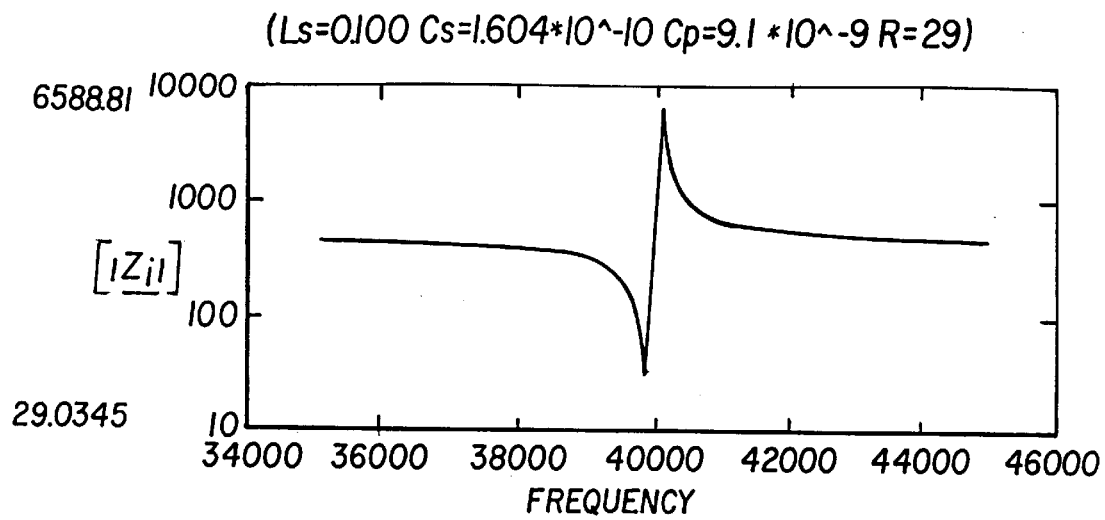
FIG. 23 is an impedance trace showing the model response for impedance at series resonance of 150 ohms and a static capacitance of 9.1 nF which are characteristic of an ECR THA under air load with 300 feet of coaxial cabling.

This shift is shown in the model response of FIGS. 21 and 23 where $C_p$ is low in FIG. 21 and increases in FIG. 23. All other values remain the same.

This yields some insight into the physical state of the ECR assembly as described by its impedance trace.

Figure 24:
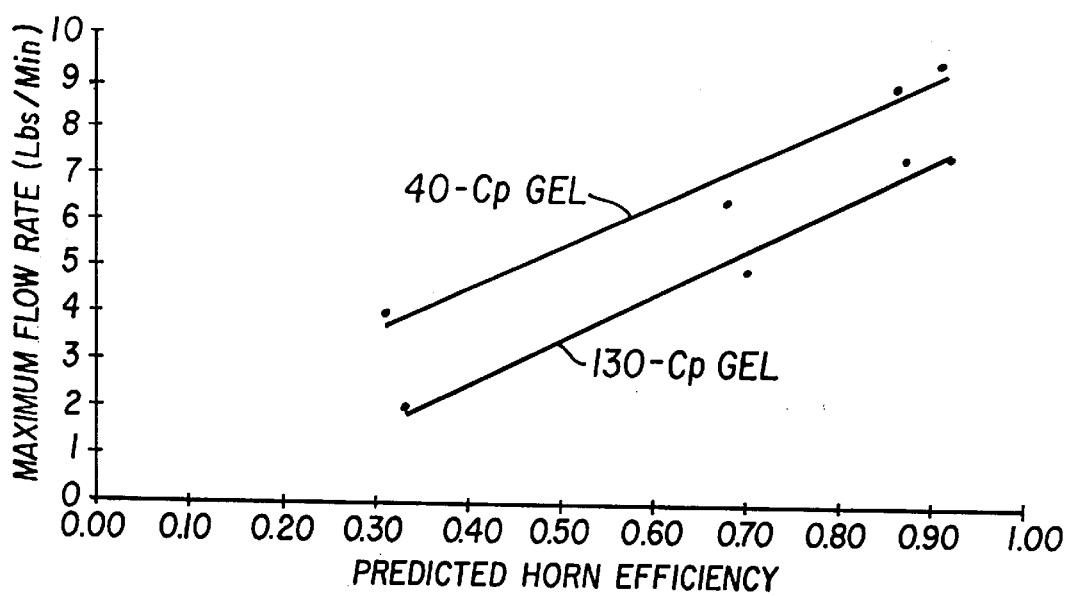
FIG. 24 is a graph plotting maximum flow rate through the ECR versus predicted THA efficiency.

A test was run to verify that there is a good correlation between the predicted efficiency of an ECR as determined through the method and apparatus of the present invention and the measured capacity of the ECR. In this test, the flow rate of gelatin with 0.15% entrained air (bubbles) is increased until the ECR becomes overloaded and bubbles are detected downstream from the ECR. This flow rate then becomes the y-axis value of the associated point plotted in FIG. 24. The test is run at different viscosities resulting in different debubbling capacities for a given THA. The efficiency calculations used different values of Rload to account for different loadings caused by the viscosity changes (Rload@40 cp=150 Ω, Rload@130 cp=160 Ω). This experiment shows a good correlation between calculated horn efficiency and debubbling capacity.

From the foregoing it will be seen that this invention is one well adapted to attain all of the ends and objects hereinabove set forth together with other advantages which are apparent and which are inherent to the process.

It will be understood that certain features and subcombinations are of utility and may be employed with a reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for evaluating the performance of a transducer horn assembly used in a debubbling operation, the method comprising the steps of:

(a) connecting a test circuit between the transducer horn assembly and a signal analyzer;
   (b) operating the transducer horn assembly off-line and generating a frequency dependent impedance trace for the transducer horn assembly;
   (c) operating the transducer horn assembly on-line in a debubbling operation;
   (d) sampling electrical signals applied to the transducer horn assembly during the operating step (c);
   (e) transmitting the sampled electrical signals to the signal analyzer;
   (f) maintaining the amplitude and phase relationship of the sampled electrical signals;
   (g) determining the operating frequency of the transducer horn assembly from the sampled electrical signals; and
   (h) determining if the operating frequency of the transducer horn assembly is between a series resonance frequency and a parallel resonance frequency of the transducer horn assembly according to the off-line generated frequency dependent impedance trace of step (b).

* * * * *